[72.]
NELSON H. BUNDY.
Improvement in Steam Traps.
No. 118,786.　　　　　　　　　　　Patented Sep. 12, 1871.
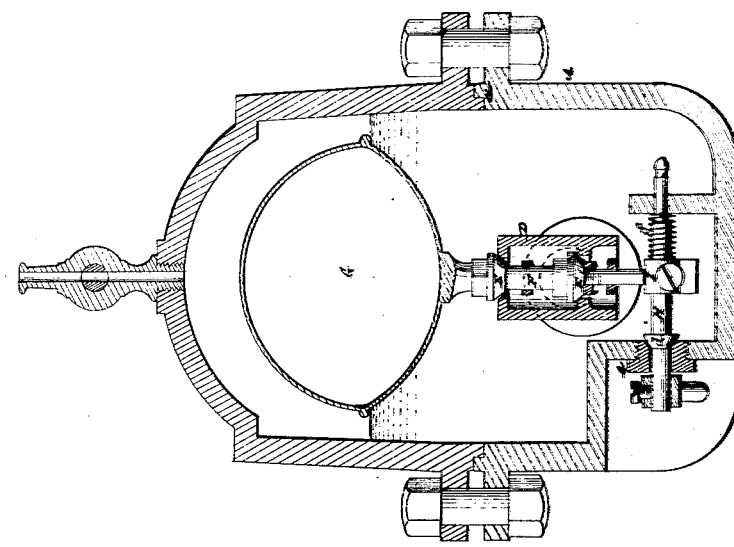
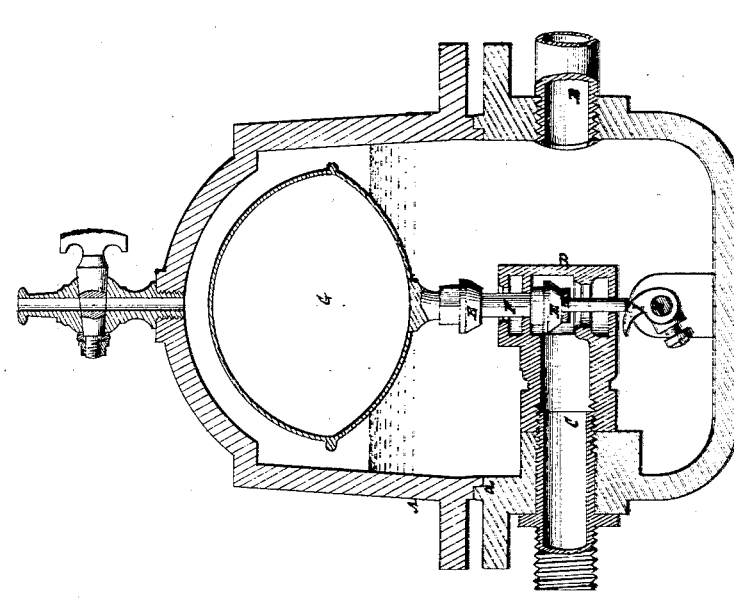
Witnesses.
Fred Haymes
Ferd Finsch
Nelson H. Bundy

UNITED STATES PATENT OFFICE.

NELSON H. BUNDY, OF NEW YORK, ASSIGNOR TO CHARLES GREGG, OF BROOKLYN, NEW YORK.

IMPROVEMENT IN STEAM-TRAPS.

Specification forming part of Letters Patent No. 118,786, dated September 12, 1871.

*To all whom it may concern:*

Be it known that I, NELSON H. BUNDY, of the city, county, and State of New York, have invented a new and useful Improvement in Steam-Traps, of which the following is a full, clear, and exact description, reference being had to the accompanying drawing forming part of this specification, and in which—

Figures 1 and 2 represent vertical sections of a steam-trap constructed in accordance with my improvement, with the working parts in different positions.

Similar letters of reference indicate corresponding parts in both figures.

The invention consists in a certain combination of a float, duplicate valves, valve-stem, valve-box, and outlet of the trap with a cam made capable of operation from the exterior of the case. The invention also consists in a combination of a cam made capable of operation from the exterior of the case with the valve-stem and valve or valves carried by it; also, in a combination of the same with an attached float. A steam-trap constructed in accordance with this invention is not only both simple and efficient, but provides for blowing through its own discharge, thereby clearing the valve-seats, and admits of an easy operation of the valves from the exterior of the trap.

In the accompanying drawing, A represents the shell or case of the trap, which is made in two parts, jointed together as at $a$. B is the inlet that connects with the steam-pipe or pipes to which the trap is applied, and C the outlet-passage or discharge for the water. This outlet-passage terminates at its inner end in a valve-box, D, open below, and that is provided with double puppet-valves E E, arranged, one above the other, on the same stem F. These valves are of the same diameter or thereabout, and are so exposed to the pressure of the fluid in the trap as to produce a balance, or nearly so. Attached to the upper end of the valve-stem F is a float, G, which, when immersed in the water of condensation in the trap, serves to counterbalance the valves and their stem, and, in combination with the balance puppet-valves, insures a most sensitive and positive action of the valves. Arranged beneath the valve-box, on a spindle, H, is a cam, I, which is set to lift upon the lower end of the valve-stem to raise or open the valves E when required, for the purpose of blowing out, by turning the spindle H in a suitable direction. Said spindle is made to project at its one end through the case so as to be capable of operation by a crank or handle from the exterior, and is provided with a cone, $d$, which fits a conical recess in a gland, $e$, through which said spindle projects, to prevent leakage past the spindle, that is forced outward by a spring, $f$, operating to press the cone against its seat. From this description it will be seen that not only is the blowing out of the trap effected through its own discharge or outlet for the water of condensation, thereby dispensing with a separate blowing-out arrangement and keeping the valve-seats clear of collecting matter, but the valves may be lifted from the exterior of the case to effect such result, and when the valves are of a balance description and buoyed by an attached float, the same is accomplished with the greatest facility.

What is here claimed, and desired to be secured by Letters Patent, is—

The combination of the float G, the valves E E, the stem F, the valve-box D, the outlet C of the trap, and the cam I, made capable of operation from the exterior of the case, substantially as specified.

NELSON H. BUNDY.

Witnesses:
FRED. HAYNES,
R. E. RABEAU.